UNITED STATES PATENT OFFICE.

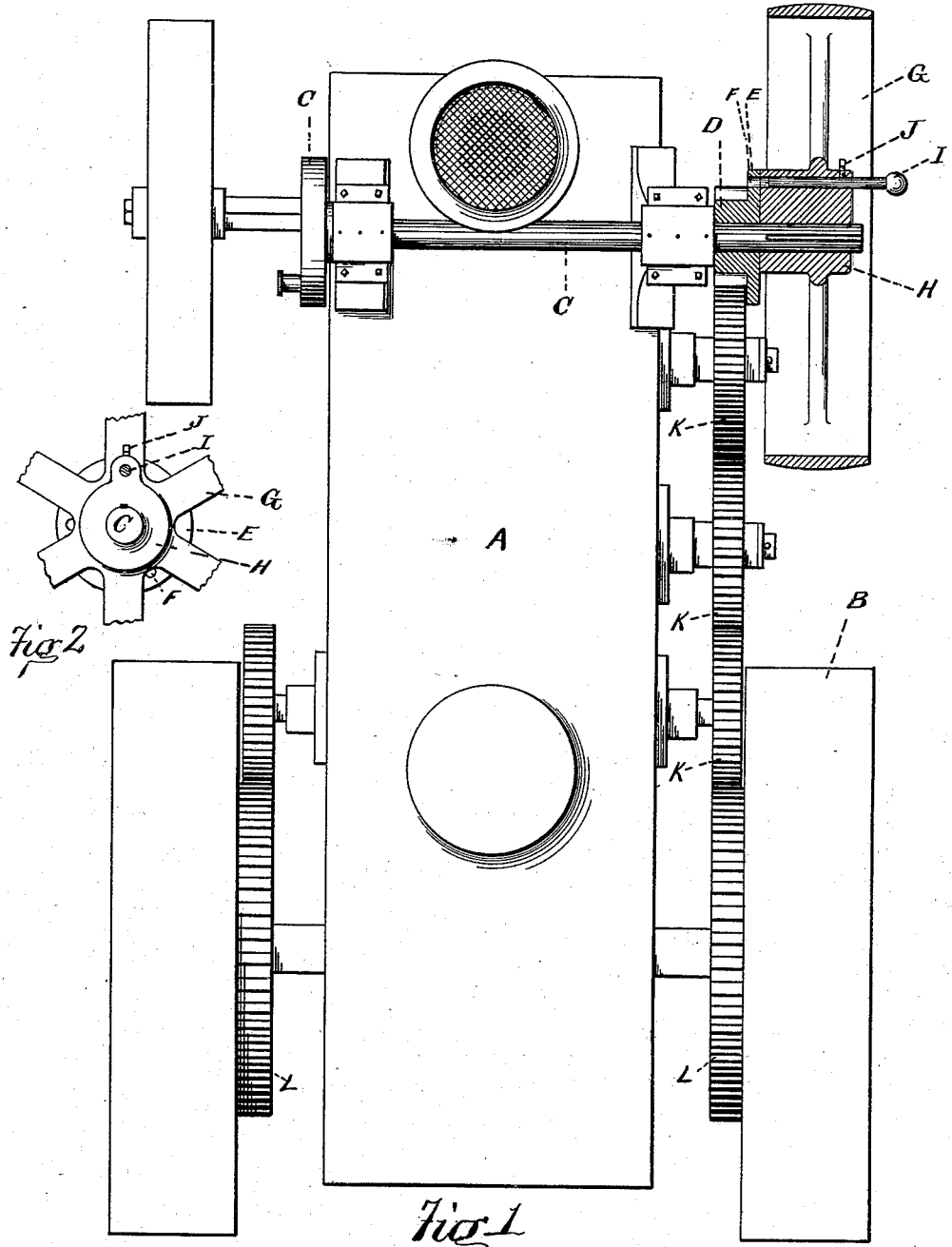

GEORGE H. HELVEY, OF HAMILTON, OHIO, ASSIGNOR TO THE HOOVEN, OWENS & RENTSCHLER COMPANY, OF SAME PLACE.

TRACTION-ENGINE.

SPECIFICATION forming part of Letters Patent No. 262,894, dated August 15, 1882.

Application filed May 19, 1882. (No model.)

*To all whom it may concern:*

Be it known that I, GEORGE H. HELVEY, of Hamilton, Butler county, Ohio, have invented certain new and useful Improvements in Traction-Engines, of which the following is a specification.

This invention pertains to traction-engines arranged to transmit power to a machine—as a thrasher—while standing, and relates to the transmitting devices between the crank-shaft of the engine and the traction-wheels.

In the accompanying drawings, Figure 1 is a plan of the engine with some details in section, and Fig. 2 is an end view of the hub of the fly-wheel.

The letters denote: A, boiler; B, traction-wheels; C, crank-shaft of engine, the engine itself not being shown; D, a pinion on the crank-shaft; E, a flange or shroud on this pinion; F, holes in the face of this flange; G, the fly-wheel; H, the hub of the fly-wheel; I, a pin arranged to slip in a hole bored in the fly-wheel hub parallel with the crank-shaft; J, a set-screw in the hub, bearing on the pin I to hold it where set; K, train of idle-gears between crank-shaft C and traction-wheels B, and L the gears attached to the traction-wheels.

The pinion D is loose upon the crank-shaft, and when the pin I is in the position indicated in Fig. 1 the train K and traction-wheels B remain motionless while the crank-shaft is transmitting power through a belt on the fly-wheel to some machine. The belt being moved and the pin I pushed inward till it engages with a hole, F, in the flange of the pinion D, the pinion will be locked to the crank-shaft and motion transmitted through the train K to the traction-wheels. If it is desired to pump up water while the engine is temporarily stopped on the road, the pin I is withdrawn and the engine set running without affecting the traction-wheels.

I claim as my invention—

In a road-engine, the combination, substantially as set forth, of a crank-shaft arranged and adapted to be revolved by a steam-motor, a pair of bearings to support said shaft, a band-wheel fixed to said shaft and adapted to transmit motion from said shaft by a belt, a gear-pinion disposed between said band-wheel and one of said bearings on said shaft, and adapted for transmitting motion from said shaft by gearing, a shroud or flange upon said pinion, and a clutch-pin fitted to slide through a hole in the hub of said band-wheel and engage in a hole in the shroud of said pinion, whereby said transmissions may be effected together or independently.

GEORGE H. HELVEY.

Witnesses:
J. W. SEE,
JOHN LORENZ.